United States Patent [11] 3,624,539

[72] Inventors Chih-Yu Kao
Lawrence;
Carl F. Kurth, Andover, both of Mass.

[21] Appl. No. 885,751
[22] Filed Dec. 17, 1969
[45] Patented Nov. 30, 1971
[73] Assignee Bell Telephone Laboratories, Incorporated
Murray Hill, Berkeley Heights, N.J.

[54] EQUALIZER HAVING A PLURALITY OF MAIN PATH SHAPING NETWORKS AND FEEDFORWARD AND FEEDBACK PATHS
11 Claims, 3 Drawing Figs.

[52] U.S. Cl. .......... 330/84, 330/126, 330/143, 330/151, 333/18, 333/28 R
[51] Int. Cl. .......... H03f 3/68
[50] Field of Search .......... 330/126, 84, 151, 143–145; 333/18, 18 T, 28 A

[56] References Cited
UNITED STATES PATENTS
3,508,153 4/1970 Gerrish et al. .......... 333/18 X

*Primary Examiner*—Roy Lake
*Assistant Examiner*—James B. Mullins
*Attorneys*—R. J. Guenther and E. W. Adams, Jr.

ABSTRACT: A multibump equalizer wherein a plurality of shaping networks are serially connected between a first summing network-amplifier combination and individual inputs to a second summing network-amplifier combination. A frequency independent feedforward path connects the input to the equalizer, which is also connected to an individual input of the first summing network, to an individual input on the second summing network. A frequency independent feedback path connects the output of the equalizer, which is also connected to the output of the first amplifier, to an individual input of the first summing network.

INVENTORS C. KAO
C. F. KURTH
BY John P. McDonnell
ATTORNEY

EQUALIZER HAVING A PLURALITY OF MAIN PATH SHAPING NETWORKS AND FEEDFORWARD AND FEEDBACK PATHS

BACKGROUND OF THE INVENTION

This invention relates to signal transmission systems and, more particularly, to equalizing networks employed in such systems.

An unequalized transmission system, whether it is made up of a single pair of wires or a coaxial cable, seldom exhibits transfer characteristics which are appropriate for sending television, multiplex telephone, or data signals over long distances. Normally such signals require a medium which exhibits a substantially flat loss-frequency characteristic. When the facility is installed, therefore, manually adjustable equalizers are used to compensate for those imperfections which are substantially constant. Since transmission is also a function of ambient temperature and other unpredictable parameters which are not constant, it is also necessary to provide automatically adjustable equalizers, normally called regulators, to correct for transmission deviations which vary with time.

The automatically adjustable equalizers of the prior art often employ a relatively large number of individual amplifiers and shaping networks with two or three shaping networks employed for every amplifier. In a typical equalizer, of this type, amplifiers and shaping networks are alternately connected in series between input and output hybrid transformers with each amplifier having a shaping network connected around the amplifier in a local feedback loop. Each shaping network is designed to introduce loss at a different band of frequencies in the signal band spectrum with preferably some overlap to provide equalization throughout the whole signal spectrum. The amplifiers are included to provide impedance matching between the shaping networks. The loss introduced by the shaping networks is usually automatically varied by a control circuit in accordance with the deviations introduced by the transmission system on one or more reference signals. Unpredictable transmission deviations with time are thereby equalized.

The relatively large number of amplifiers required by these automatic equalizers appreciably increases the cost of the equalizing unit. The need for hybrid transformers also increases the unit cost and, moreover, introduces transhybrid losses and phase shift over the wideband range of frequencies. Other schemes which could be devised using these prior art techniques to avoid either one or more of the impedance matching, loss, and phase shift problems have proved to be difficult to realize physically. All such prior art equalizer schemes additionally introduce amplifier noise which interferes with the quality of transmission.

It is, therefore, an object of this invention to provide an equalization network which eliminates the need for impedance matching amplifiers and hybrid transformers.

It is a further object of the invention to physically realize the foregoing object simply and at a lower cost than the equalizing networks of the prior art.

It is still a further object of the invention to reduce substantially the noise introduced by the amplifiers of the prior art.

SUMMARY OF THE INVENTION

The present invention is directed to a multibump equalizer wherein a plurality of shaping networks are connected in a main path between a first summing network and first amplifier and individual inputs of a second summing network, the output of which is connected to a second amplifier. A frequency independent feedforward path connects the input to the equalizer, which is also connected to an input to the first summing network, to an individual input of the second summing network. A feedback path connects the output of the equalizer, which is also connected to the output of the second amplifier, to the first summing network. Each shaping network provides equalization over an individual frequency band which overlaps with adjacent bands to provide equalization over the entire frequency spectrum to be equalized. Each of the first summing network —first amplifier and second summing network —second amplifier combinations may be inexpensively, and conveniently, realized with individual operational amplifiers, thereby eliminating the need for impedance matching and reducing the noise introduced by the amplifiers.

BRIEF DESCRIPTION OF THE DRAWINGS

Other objects and features of the present invention will be apparent from the following discussion and drawings in which.

DETAILED DESCRIPTION

Figure 1:
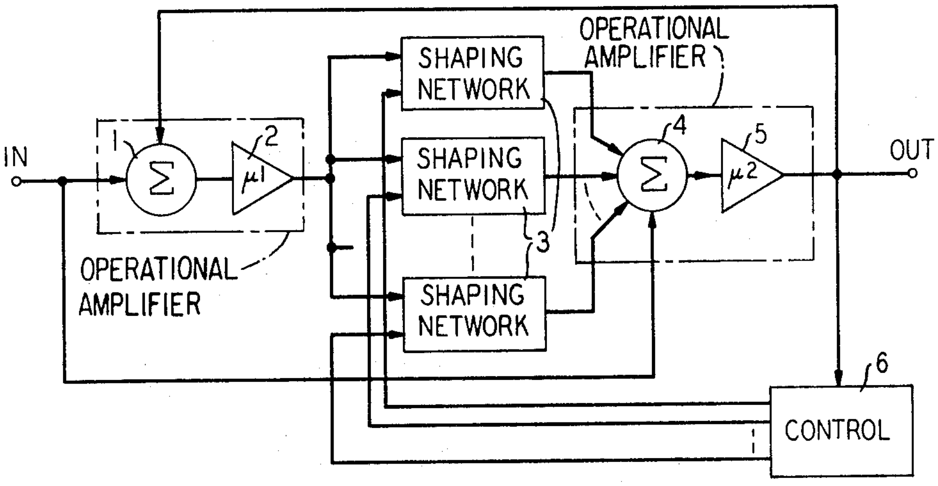
FIG. 1 is a block diagram embodiment of the present invention.

In the equalizer of FIG. 1, the main path between the input and output terminals comprises a first summing network 1, a first amplifier 2, a plurality of shaping networks 3 having each of their outputs connected to individual inputs of a second summing network 4, and a second amplifier 5. A control circuit 6 is connected to each of the shaping networks 3 and to the equalizer output terminal to provide equalization correction, as discussed hereinafter. The dashed boxes surrounding summing network 1 and amplifier 2 and summing network 4 and amplifier 5 indicate that each of these networks may be combined in individual operational amplifiers.

Figure 2:
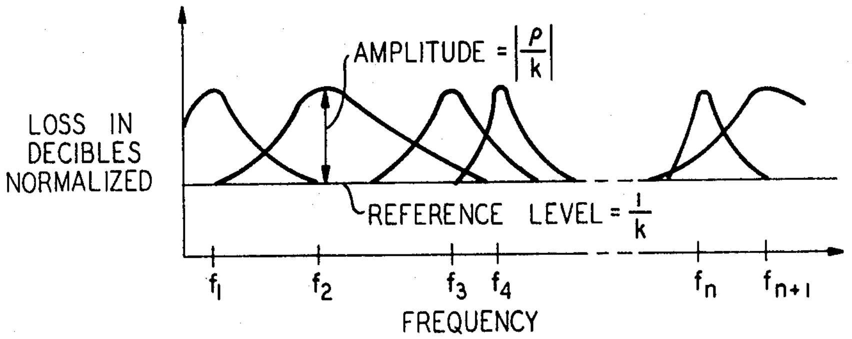
FIG. 2 illustrates a multibump equalization characteristic useful in describing the function of the embodiment of FIG. 1.

Input signals to the equalizer of FIG. 1 are fed to an individual input of summing network 1 and to an individual input of summing network 4. A feedback path connects the signal appearing at the output terminal of the equalizer to a second individual input of summing network 1. The output sum signal from the summing network 1 is, in turn, amplified by amplifier 2 which, as shown on the drawing, has a gain of $\mu_1$ and then fed to the input of each of the shaping networks 3. Each of these shaping networks equalizes an individual band of frequencies in the signal band spectrum to be equalized. The transmission characteristics of the shaping networks may overlap to insure equalization throughout the entire signal band spectrum. If the shaping networks of FIG. 1 were to employ circuitry which has a (sin $/x$)$/x$ loss vs. frequency characteristic, a multibump equalization characteristic such as illustrated in FIG. 2 results. In the multibump transmission characteristic of FIG. 2, the "first" shaping network introducing a bump which peaks at frequency $f_1$; the "second" shaping network introduces a bump which peaks at frequency $f_2$; and so on to the "$n$+1" shaping network which introduces a bump which peaks at frequency $f_{n+1}$. As discussed hereinafter, the amplitude of the bumps may be varied automatically by the control circuit 6 in accordance with unpredictable transmission deviations such as those due to ambient temperature. The outputs of the shaping networks are fed, with a feedforward portion of the input signal, to the individual inputs of the summing network 4 where they are combined or summed. The summed output signal is then amplified by amplifier 5 which has a gain of $\mu_2$, as noted in the drawing. As discussed hereinafter, the control network 6 controls the amplitude of the loss vs. frequency characteristic of the shaping networks in accordance with the effects of transmission deviations on a reference signal appearing at the output of the equalizer.

Figure 3:
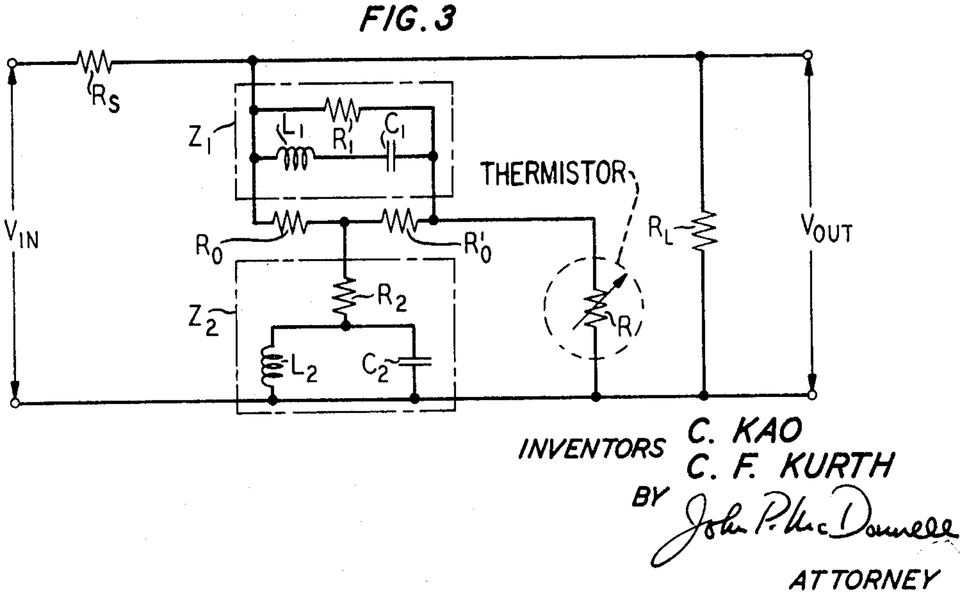
FIG. 3 schematically illustrates a constant-R bridged-T network which may be employed as a shaping network in FIG. 1.

The shaping networks 3 may be any compatible network which provides a desired equalization characteristic. As noted heretofore, for the multibump equalization characteristic of FIG. 2 a shaping network which simulates the (sin $x/x$ bump shape could be used. One network which might be employed in such a system is the constant-R bridged-T network illustrated in FIG. 3. In the circuit of FIG. 3, a resistor $R_o$ is serially connected with the shaping network input terminals and a resistor $R_L$ shunts the output terminals. Resistors $R_o$, $R_o'$, and R are serially connected across resistor $R_L$. The parallel combination of resistor $R_1$, and the series connected inductor $L_1$ and capacitor $C_1$, are connected across the combination of resistors $R_o$ and $R_o'$. Inductor $L_2$ is serially connected with resistor $R_2$ across resistors R and $R_o'$. Capacitor $C_2$ is connected across inductor $L_2$. For simplicity in the treatment of this network, the components $R_1$, $L_1$, and $C_1$ are shown in a dashed box as impedance $Z_1$, while the components $R_2$, $L_2$, and $C_2$ are shown in a second dashed box as impedance $Z_2$.

Constant-R bridged-T type shaping networks of the type illustrated in FIG. 3 are well known in the art and discussed in detail at page 229 et. seq. of the text *Electric Network Synthesis* by Myril B. Reed published in 1955 by Prentice-Hall, Inc. For present purposes it appears sufficient to note that the voltage transfer function of the circuit of FIG. 3 may be expressed as follows:

$$\frac{V_{out}}{V_{in}}=\frac{1}{k}\left[1+\rho\frac{R_o^2}{(Z_1+R_o)^2}\right] \quad (1)$$

where $$R_s=\frac{R_oR_L}{R_L-R_o},(R_L>R_o);$$

$$\frac{1}{k}=\frac{R_L-R_o}{2R_L};$$

$$R_o=R_o'; \text{ and}$$

$$\rho=\frac{R-R_o}{R+R_o}$$

From the transfer function of equation (1), it is seen that the voltage transfer function has a positive or negative bump of amplitude $\left|\frac{\rho}{k}\right|$ with respect to the reference level $1/k$. From this equation the shape of the bump is determined by the real part of the function $$\alpha=\frac{R_o^2}{(Z_1+R_o)^2} \quad (2)$$

and is centered around a frequency $$f=½\pi\sqrt{LC} \quad (3)$$

where $LC=L_1C_1=L_2C_2$. (Since the loss or gain of the equalizer usually only need be figured to a first approximation, only the real part of $\alpha$ need be considered.) In the transmission characteristic illustrated in FIG. 2 the center frequencies of each of the shaping networks are shown as $f_1, f_2, f_3, f_4 \ldots f_n$ and $f_{n+1}$ with the reference level as $1/k$; and the amplitude of the positive bump as $\left|\frac{\rho}{k}\right|$. (The shape being determined by the function $$\alpha=\frac{R_o^2}{(Z_1+R_o)^2}$$

as noted heretofore.) The negative bump indicated from the function is not shown on the drawing for simplicity.

In the equalizer of FIG. 1 the gain $\mu_1$ and $\mu_2$ of the amplifiers 2 and 5 is related by the expression $$\mu_2=\frac{1}{\frac{1+2n\mu_1}{k}} \quad (4)$$

where $n$ is the number of shaping networks 3 employed, and $\mu_1$, $\mu_2$, and $k$ have been defined heretofore. With this relationship, the overall transfer function of the equalizer of FIG. 1 may be expressed as follows:

$$\frac{V_{out}}{V_{in}}=\frac{1+\mu_2\sum_{i=1}^{n}\frac{1}{k}[1+\rho_i\alpha_i]}{1-\mu_2\sum_{i=1}^{n}\frac{1}{k}[1+\rho_i\alpha_i]+\frac{2n\mu_2}{k}} \quad (5)$$

From this equation and the foregoing discussion of the constant-R, bridged-T shaping network schematically illustrated in FIG. 3, it is readily seen that the parameters of the shaping network determine the shape, amplitude, and level of the loss vs. frequency characteristic of the overall equalizer. It should be noted in considering the overall transfer function and system that only the element R of shaping network of FIG. 3 is variable. Several parameters of the transmission characteristics shown in FIG. 2 are thus predetermined, namely, the frequency $f=½\pi\sqrt{LC}$ at which the "peak" of the bump of the characteristic of FIG. 2 occurs; the gain of the amplifiers $\mu_1$ and $\mu_2$; and the shape of the equalizer characteristic for each shaping network which is determined to a first approximation by the real part of the function $$\alpha=\frac{R_o^2}{(Z_1+R_o)^2}$$

Once the equalizer is installed, therefore, equalization may be simply obtained merely by varying the $\rho$ term of the aforenoted overall transfer function which varies the magnitude of the loss (or gain) introduced into the overall transfer function. Since as noted heretofore $$\rho=\frac{R-R_o}{R+R_o}$$

, the $\rho$ term, and hence the equalization characteristic over a desired band of frequencies or the whole transmitted frequency spectrum, may be varied simply by varying the resistance of the resistor R of the shaping network of FIG. 3. Since it can be shown that the loss (or gain) introduced by the equalizer of FIG. 1 can be expressed in db. to a good approximation by the equation:

$$\text{Loss (db)} \approx -8.686\cdot\frac{2\mu_1}{k+n\mu_1}\text{Re}\sum_i\rho_i\alpha_i \quad (6)$$

where there is a linear relationship between the loss (or gain) of the equalizer in db. and the $\rho$ term, both these terms will vary with variations of R. Equalization loss or gain in db. may therefore be simply and advantageously obtained merely by varying the magnitude of the component R in FIG. 3. The foregoing approximation assumes that $$\left|\frac{\mu_1}{k+n\mu_1}\sum_i\rho_i\alpha_i\right|<1 \quad (7)$$

The resistor R of FIG. 3 may, of course, be any compatible component such as, for example, a thermistor, just as the shaping network 3 of FIG. 1 may be any compatible network which provides a desired equalization characteristic. In such an equalization system, the control circuit 6 of FIG. 1 would control the characteristic of the shaping networks in accordance with the deviations introduced by the transmission system on a reference signal level detected at the output of the equalizer. In the case of the shaping network of FIG. 3, for example, the resistor R, or a thermistor inserted in its place, would be varied by either mechanical, electrical, or environment temperature means to vary the amplitude, or loss introduced by, the equalization bumps in response to unpredictable variations in the transmission characteristics. One such equalization scheme showing such a control network 6 in detail is disclosed in our opening patent application Ser. No. 864,664 , filed Oct. 8, 1969, which issued a U.S. Pat. No. 3,573,667 on Apr. 6, 1971. Although the transmission characteristic of FIG. 2 is normalized for each shaping network, it should be obvious that a greater or lesser degree of equalization could, and would, be obtained over selected portions of the frequency spectrum in which there were unpredictable transmission variations not affecting the other portions of the frequency spectrum. It should be equally obvious that amplifiers or attenuators could be inserted in the feedforward and feedback paths to modify the overall equalizer transfer function in any desired manner.

In summary, then, the present invention is a multipath equalizer with a plurality of shaping networks connected between a first amplifier and a first summing network, and a second amplifier and a second summing network. The second summing network has an individual input for each shaping network and an input for a portion of the input signal which is fed forward in a frequency independent path. A feedback path connects the output of the equalizer to an individual input of the first summing network with the input signal being connected to another individual input of the first summing network. In a preferred embodiment, the shaping network would comprise a constant-R bridged-T network to provide a multibump equalizer characteristic, so-called because of the shape of the loss vs. frequency characteristic of such a network. Each shaping network would be chosen to cover an individual frequency band in the overall frequency spectrum with some overlap to insure complete spectrum equalization. The amplitude of each bump would be automatically determined in accordance with the equalization requirements of each frequency band covered by each shaping network over the complete transmitted frequency spectrum. With the configuration of the present invention illustrated in FIG. 1, the first amplifier —first summing network and second amplifier —second summing network may be realized with individual, inexpensive, and compact operational amplifiers. The cost of equalization and the space requirements of the equalizers, which are often at remote locations, are thus appreciably reduced.

The above-described arrangement is illustrative of the application of the principles of the invention. Other embodiments may be devised by those skilled in the art without departing from the spirit and scope thereof.

What is claimed is:

1. An equalizer having a main path which comprises a first summing network having a plurality of inputs, one of said plurality of inputs being connected to the input terminal of said equalizer, a first amplifier having its input connected to the output of said first amplifier, each of said shaping networks providing equalization over an individual band of frequencies in the frequency spectrum to be equalized, a second summing network having a plurality of inputs individually connected to the output of each of said plurality of shaping networks, and a second amplifier having its input connected to the output of said second summing network and its output connected to the output terminal of said equalizer, a feedforward path connecting said equalizer input terminal to an individual input of said second summing network, and a feedback path connecting the output terminal of said equalizer to an individual input of said first summing network, whereby equalization over a predetermined frequency spectrum is obtained.

2. An equalizer in accordance with claim 1 wherein said feedback and feedforward paths are frequency independent.

3. An equalizer in accordance with claim 1 wherein said first amplifier and said first summing network comprise a first operational amplifier and said second amplifier and said summing network comprise a second operational amplifier.

4. An equalizer in accordance with claim 1 wherein a predetermined simulated (sin $x$)/$x$ characteristic is provided by each of said shaping networks.

5. An equalizer in accordance with claim 1 wherein a control network is connected to the output terminal of said equalizer and to each of said shaping networks to control the characteristics of said shaping networks in accordance with the level of a reference signal at the output terminal of said equalizer.

6. An equalizer in accordance with claim 5 wherein each of said shaping networks comprises a constant-R bridged-T network.

7. An equalizer in accordance with claim 6 wherein said constant-R bridged-T network includes a variable impedance controlled by said control circuit to vary the loss in db. of said shaping network linearly with the impedance of said variable impedance.

8. An equalizer in accordance with claim 7 wherein said variable impedance is a thermistor.

9. An equalizer in accordance with claim 7 wherein the relationship $$\mu_2=\frac{1}{1+\frac{2n\mu_1}{k}}$$

exists between said first and second amplifiers, where $\mu_1$ is the gain of said first amplifier, $\mu_2$ is the gain of said second amplifier, $n$ is the number of said plurality of shaping networks, and $k$ is the ratio $$\frac{1}{k}=\frac{R_L-R_o}{2R_L}$$

, where $R_o$ is the resistance of the lattice arms of said constant-R bridged-T network and $R_L$ is the resistance connected across the output terminals of said shaping network.

10. An equalizer having a main path which comprises a first summing network having a plurality of inputs, one of said plurality of inputs being connected to the input terminal of said equalizer, a first amplifier having its input connected to the output of said first summing network, a plurality of shaping networks having their inputs connected to the output of said first amplifier, each of said shaping networks providing equalization over an individual band of frequencies in the frequency spectrum to be equalized, a second summing network having a plurality of inputs individually connected to the output of each of said plurality of shaping networks, each of said shaping networks comprising a constant-R bridged-T network which includes a variable resistor, and a second amplifier having its input connected to the output of said second summing network and its output connected to the output terminal of said equalizer, a frequency independent feedforward path connecting said equalizer input terminal to an individual input of said second summing network, a frequency independent feedback path connecting the output terminal of said equalizer to an individual input of said first summing network, and a control network connected to the output terminal of said equalizer and to each of said shaping networks to vary the resistance of said variable resistor in said shaping networks in accordance with the level of a reference signal at the output terminal of said equalizer.

11. An equalizer in accordance with claim 10 wherein said first amplifier and said first summing network comprise a first operational amplifier and said second amplifier and said second summing network comprise a second operational amplifier.

* * * * *